United States Patent [19]

Göckler

[11] 4,388,724

[45] Jun. 14, 1983

[54] ADAPTIVE EQUALIZER DEVICE

[75] Inventor: Heinz Göckler, Backnang, Fed. Rep. of Germany

[73] Assignee: Licentia Patent-Verwaltungs-GmbH, Frankfurt am Main, Fed. Rep. of Germany

[21] Appl. No.: 223,772

[22] Filed: Jan. 9, 1981

[30] Foreign Application Priority Data

Jan. 11, 1980 [DE] Fed. Rep. of Germany ....... 3000856

[51] Int. Cl.³ .............................................. H04B 3/14
[52] U.S. Cl. ..................... 375/14; 328/162; 333/18
[58] Field of Search ......................... 375/12, 14, 15, 16; 333/18; 455/303, 305; 364/724; 328/162

[56] References Cited

U.S. PATENT DOCUMENTS 3,879,664  4/1975  Monsen ................................ 375/14
4,097,807  6/1978  Fujimura ............................. 375/14
4,255,791  3/1981  Martin ................................. 375/14

OTHER PUBLICATIONS

IEEE Transactions on Information Theory, vol. IT 15, No. 4, Jul. 1980, pp. 484–497.
Proceedings of IEEE, vol. 122, No. 10, Oct. 1975, pp. 1097–1104.
IEEE Transactions on Information Theory, Jan. 1975, pp. 56–64.

Primary Examiner—Benedict V. Safourek
Attorney, Agent, or Firm—Spencer & Kaye

[57] ABSTRACT

In a device for equalizing multiphase and/or multiamplitude modulated data signals, which device includes a decider connected to receive a demodulated input signal and to produce a demodulated output signal, an equalizer, and a difference forming member connected to produce an output signal representative of the difference between the demodulated decider output and input signals, the difference forming member output signal being supplied to the equalizer as a control value for adaptively setting the equalizer coefficients, a multiplier is connected between the decider and the equalizer for multiplying the signal supplied thereto by a positive scalar value.

7 Claims, 3 Drawing Figures

ADAPTIVE EQUALIZER DEVICE

BACKGROUND OF THE INVENTION

The present invention relates to a device for equalizing multiphase and/or multiamplitude modulated data signals by means of a decider and an equalizing filter, in which a difference forming member feeds a representation of the difference between the demodulated decider output and input signals to the equalizer filter as a control value for the adaptive setting of the equalizer coefficients.

Such a device is disclosed in the paper entitled "Datenübertragung mit 4,8 kBit/sec im Fernsprechnetz: Entwurf und Realisierung eines Modems nach den CCITT Empfehlungen V. 27 bis /ter" [Data Transmition operating at 4.8 kBit/sec in a telephone network: Design and realization of a modem according to CCITT Recommendations V. 27 bis /ter] by Göckler, Hofmeister and Till, published by Wissenschaftliche Berichte [Scientific Reports] AEG-TELEFUNKEN, Vol. 51 (1978), No. 4/5, pages 231-245.

The drawback in such adaptive equalizing devices is that due to the limited word length, there may be an overrun of the coefficients even when there are no extreme channel distortions.

SUMMARY OF THE INVENTION

It is therefore an object of the present invention to provide an adaptive equalizing device of the above-mentioned type in which the coefficient overruns occur not at all or only to a slight degree even at extreme distortions.

The above and other objects are achieved, according to the invention, in a device for equalizing multiphase and/or multiamplitude modulated data signals, which device includes a decider connected to receive a demodulated input signal and to produce a demodulated output signal, an equalizer, and a difference forming member connected to produce an output signal representative of the difference between the demodulated decider output and input, signals for difference forming member output signal being supplied to the equalizer as a control value for adaptively setting the equalizer coefficients, by the provision of a multiplier connected between the decider and the equalizer for multiplying the signal supplied thereto by a positive scalar value.

An equalizing circuit according to the present invention makes it possible to scale the coefficients for the adaptive setting of the equalizing filters in such a way that even at the most unfavorable distortions to be expected on the transmission path no, or only the smallest possible number of, coefficient overruns will occur. With this scaling, it is further possible to convert coefficient values which have been set near the zero region to a higher value range. This, firstly, furnishes finer equalization and, secondly, is subject to less influence from the noise signals generated in the equalizer itself.

According to preferred embodiments of the invention, the scalar value is automatically dimensioned in such a manner that the equalizer coefficients take on values within a given range, and there is provided a threshold value member connected for influencing the scaler value when the equalizer coefficient values fall below or exceed a given range. An equalizer device of this type permits automatic scaling of the coefficients in a given optimum value range.

DESCRIPTION OF THE PREFERRED EMBODIMENTS

Figure 1:
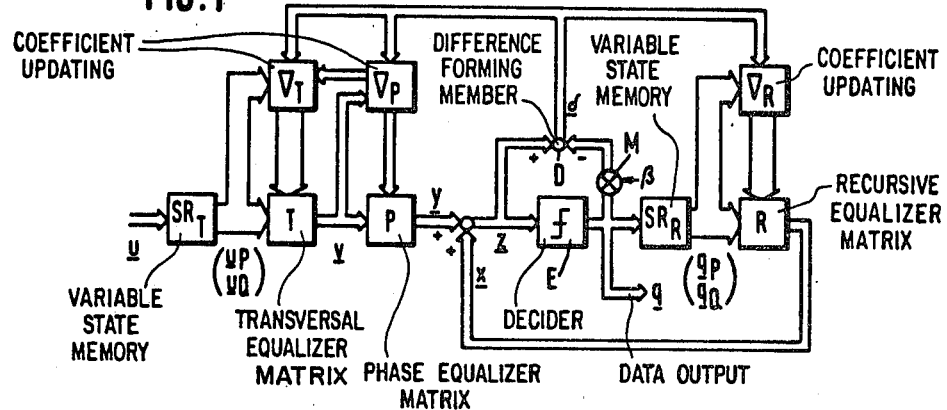
FIGS. 1-3 are block circuit diagrams of three preferred embodiments of the invention.

FIG. 1 shows an embodiment of an adaptive equalizing device according to the invention with digital signal processing employing the principle of decision feedback. The modulation method employed is an eight-stage phase modulation, or phase shift keying, with difference coding (8-DPSK).

Input signal data pairs u travel through a linear filter configuration, which has been assembled from a variable state memory $SR_T$ and a matrix T, first to a phase equalizer or control device P. The output signal y from device P is added to a signal x furnished by the decision feedback connected equalizer member and the resulting equalized data signal z is fed to the decider E. The decision feedback on recursive equalizer member is composed of a variable state memory $SR_R$ and a matrix R.

With a sufficiently low residual distortion in the signal z, the decider output sequence q is identical with the data sequence which has been delayed by the stepping clock pulse interval. The error value signal $\delta$ is generated in a difference forming member D and is used for the adaptive setting of the equalizer parameters. In particular the error value signal is fed to the coefficient updating members $\nabla_T$, $\nabla_P$ and $\nabla_R$ for the transversal equalizer, the phase equalizer and the recursive equalizer, respectively.

According to the present invention, a multiplier M is included in front of the right-hand input of the difference forming member D so as to multiply the signal in this branch by a positive scale value $\beta$. Thus all of the coefficients, of the transversal matrix T as well as of the decision feedback connected equalizer member component R are identically weighted with the factor $\beta$. The coefficient value range is thus proportional to $\beta$; it can be reduced by selecting $\beta < 1$, which makes it possible to correctly equalize greater distortions within the limits of control (overrun limits).

Figure 2:
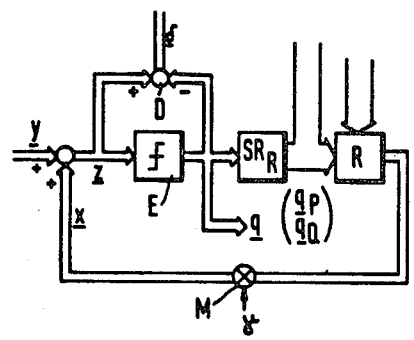

FIG. 2 shows a section of the decider feedback loop of FIG. 1 but with the multiplier M included in the decider feedback loop and multiplication being effected by the scalar value $\gamma$. In this arrangement, only the coefficients of the recursive equalizer R are weighted, namely with $1/\gamma$. The coefficients of the transversal equalizer T remain unchanged.

Figure 3:
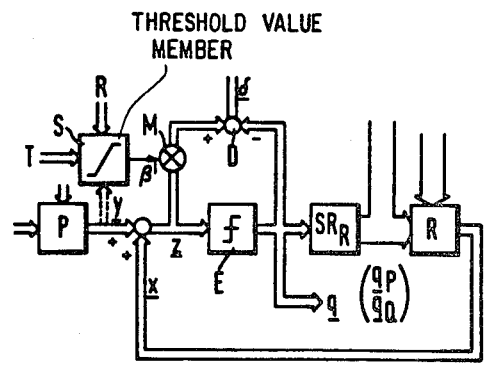

FIG. 3 also shows a section of a circuit of the type shown in FIG. 1 but here the multiplier M, which multiplies the signal value by a scalar value $\beta'$, is included in the branch in front of the left-hand input of the difference forming member D i.e., the positive input. In this way, all of the coefficients are weighted with $1/\beta'$. The scalar value $\beta'$ is influenced by a threshold value member S, which produces an output, for example, in dependence on the actual coefficient values of the transversal eqaulizer T and/or the recursive equalizer R, or in dependence, as shown in dashed lines, on the transversally and phase equalized signal train y, in such a manner that $\beta'$ becomes larger when an upper threshold value is exceeded and smaller when a lower threshold value is no longer being reached. In this way it is possible to realize automatic scaling of the equalizer coefficients which, with suitable dimensions of the upper threshold value produce no coefficient overrun and with correctly dimensioned lower threshold permit no adverse influences from the internal noise level and provide very fast, finely adapted equalization with few errors.

Advantageously the threshold value member S includes an integration member which sums individual signal or coefficient excesses over the given threshold value for a certain, settable time and averages them.

The present invention is of course not limited to adaptive equalizers with quantized feedback but applies as well for purely transversal equalizers. Moreover the equalizer circuit according to the invention can be used not only for digital but also for analog signal processing.

An adaptive decision feedback equalizer according to FIG. 1 is described in detail by Monsen "Feedback Equalization for Fading Dispersive Channels", IEEE Trans. Inform. Theory, Jan. 1971, pp. 56–64. Other types of adaptive equalizers, for instance a transversal type, are given by Proakis and Miller "An Adaptive Receiver for Digital Signaling Through Channels with Intersymbol Interference," IEEE Trans. Inform. Theory, July 1969, pp. 484–497.

To give an example for setting of the parameters $\beta,\beta'$ and $\delta$, consider the channel impulse response $u(k)$, where k is the running time index,

| u(k) | +0.15 | 0.2 | 0.3 | 1 | 0.2 | 0.25 | 0.2 |
|---|---|---|---|---|---|---|---|
| k | −3 | −2 | −1 | 0 | 1 | 2 | 3 | given by Macleod et al, Proc. IEE vol. 122, Oct. 1975, pp. 1097–1104.

Suppose an overrun limitation of 2, then the scaler value $\beta(\beta')$ must be chosen to be 1.5 (1/1.5) in order to get a maximum value of $u(o)=1.5$ according to correspondingly increased coefficients in order to allow some margin for noise and overrun.

If there is only some improvement required in the feedback portion of the equalizer, e.g. an amplification of the postcursors for $k \geq 1$ due to greater coefficient values in the feedback branch, then $\gamma$ can be chosen to be $\frac{1}{2}$ to get doubled coefficient values according to $u(1)=0.4, u(2)=0.5, u(3)=0.4$.

In this example the threshold S may be chosen to the value $S=1.5$. Then, if the modulus of y exceeds for instance the value of 1.5, $\beta'$ is set to $\beta'=1$, and vice versa, in order to avoid coefficient overruns.

The symbol $\nabla \epsilon$ means the gradient vector of $\epsilon$.

It will be understood that the above description of the present invention is susceptible to various modifications, changes and adaptations, and the same are intended to be comprehended within the meaning and range of equivalents of the appended claims.

What is claimed is:

1. In a device for the adaptive equalization of multiphase and/or multiamplitude modulated data signals, which device includes a decider, an equalizer having an output connected to the input of said decider for equalizing received data signals, and a difference forming member connected to produce an output signal representative of the difference between the input and output signals of said decider, said output signal of said difference forming member being supplied to said equalizer as a control value for adaptively setting the equalizer coefficients; the improvement comprising a multiplier, connected in a signal branch of said device containing a data signal which is fed to said input of said decider, for multiplying the data signal in said branch by a positive scalar value, such that a desired scaling of the equalizer coefficients takes place.

2. Device as defined in claim 1 wherein said multiplier is connected ahead of the positive input of said difference forming member.

3. Device as claimed in claim 1 wherein said equalizer includes a transversal equalizer portion connected between the data input of said device and said input of said decider, and a recursive equalizer portion having its signal input connected to the output of said decider and its output connected as a feedback branch to said input of said decider, and said multiplier is connected in said feedback branch between said recursive portion and said input of said decider.

4. Device as defined in claim 1 or 2 further comprising means for automatically dimensioning said scaler value in such a manner that the equalizer coefficients take on values within a given range.

5. Device as defined in claim 4 wherein said means for automatically dimensioning includes a threshold value means, connected to said multiplier, for influencing the scalar value when the equalizer coefficient values fall below or exceed a given range.

6. Device as defined in claim 4 wherein said means for automatically dimensioning includes a threshold value means, connected to said multiplier, for influencing the scalar value whenever the equalizer output signal values fall below or exceed a given range.

7. Device as defined in claim 1 wherein: said equalizer has a transversal equalizer portion and a phase equalizer portion connected in series between the data input of said device and said input of said decider; and said multiplier is connected in a signal branch connected to the output of said phase equalizing portion.

* * * * *